United States Patent [19]

Sassi

[11] Patent Number: 5,011,365
[45] Date of Patent: Apr. 30, 1991

[54] APPARATUS FOR FEEDING BUNDLES OF LAMINATIONS

[75] Inventor: Umberto Sassi, Varazze, Italy

[73] Assignee: SASSI S.r.l., Varazze, Italy

[21] Appl. No.: 356,100

[22] Filed: May 24, 1989

[30] Foreign Application Priority Data

May 25, 1988 [IT] Italy ............................. 12486 A/88

[51] Int. Cl.$^5$ ............................................. B66C 1/00
[52] U.S. Cl. ....................................... 414/737; 29/732;
29/738; 29/744; 414/225
[58] Field of Search ................ 29/732, 736, 738, 744,
29/596; 414/737, 225

[56] References Cited

U.S. PATENT DOCUMENTS 4,311,424  1/1982  Schwab et al. ................... 29/738 X
4,387,508  6/1983  Wyatt .............................. 29/744 X

FOREIGN PATENT DOCUMENTS 557584  12/1972  Switzerland ..................... 29/738

Primary Examiner—Carl E. Hall
Attorney, Agent, or Firm—Pollock, Vande Sande & Priddy

[57] ABSTRACT

Apparatus for feeding bundles of laminations (PL) to a machine that processes or uses such bundles, particularly to a machine for making rotors or stators for electric machines, transformers, or the like, and having a vertical feeding duct (1) into which the vertically oriented bundles of laminations are introduced in sequence from above. A movable grasping and transferring device (10, 11) with one or more permanent magnets or electromagnets cyclically takes a bundle of laminations (PL) from a stationary or movable magazine (3) located in a withdrawal station and conveys this bundle co-axially over the opening of the feeding duct (1) of the machine, so as to set the bundle into the duct.

10 Claims, 3 Drawing Sheets

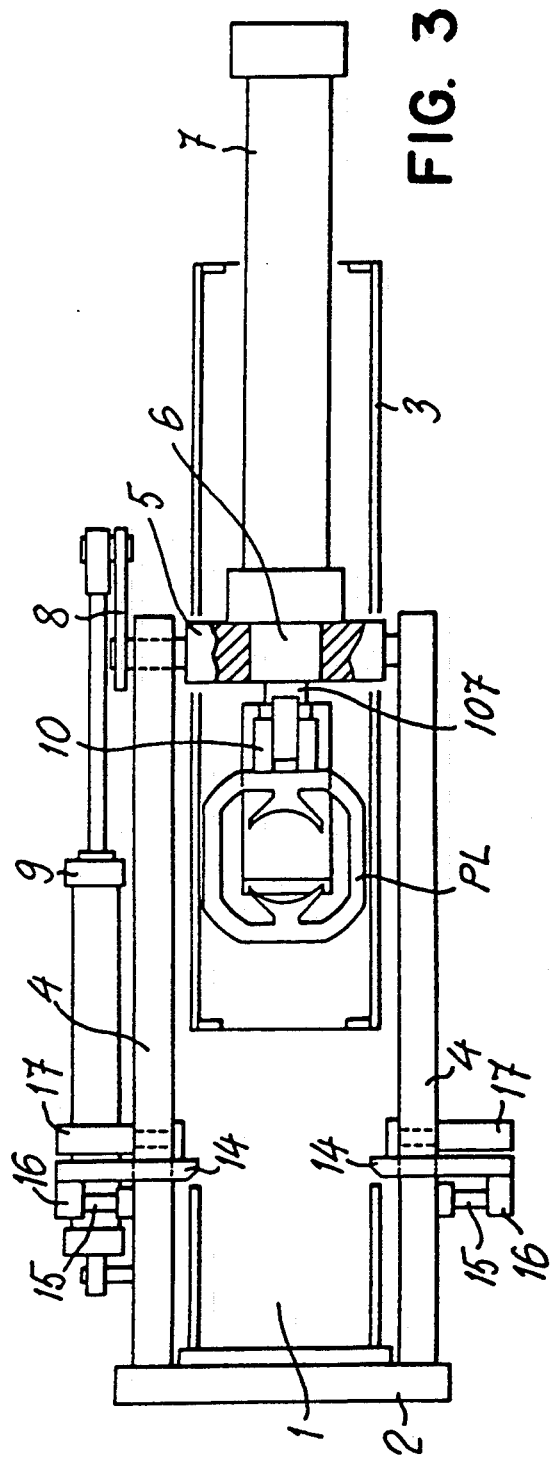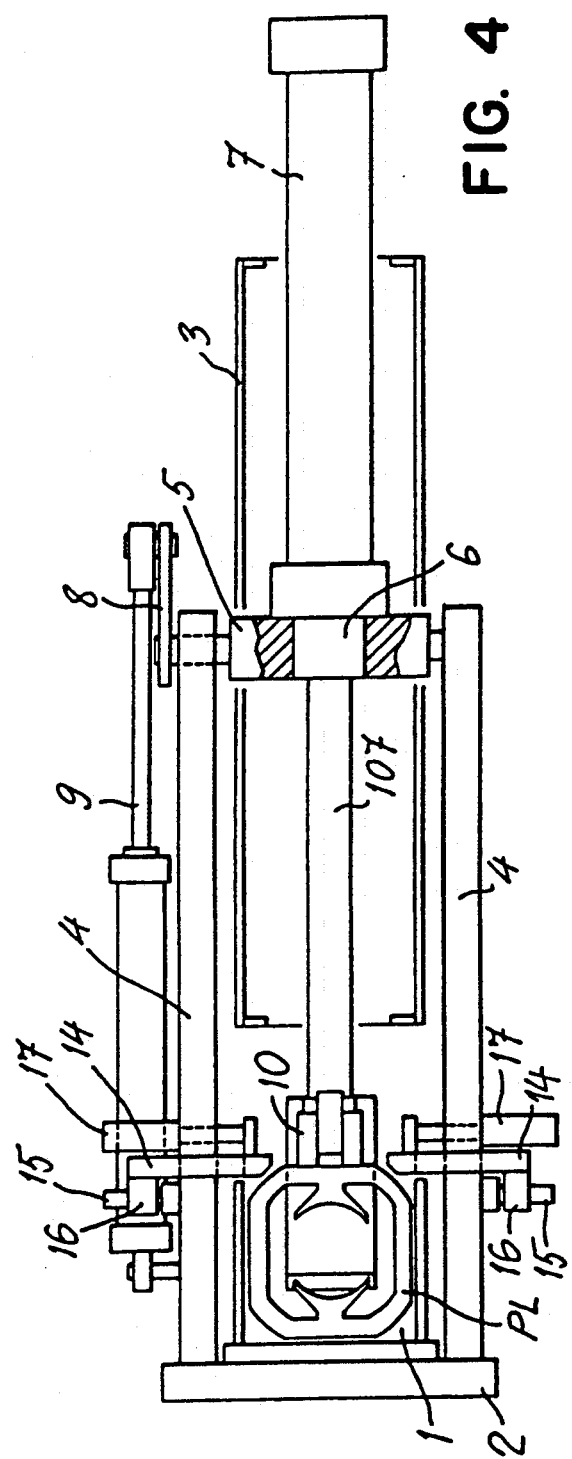

APPARATUS FOR FEEDING BUNDLES OF LAMINATIONS

SUMMARY OF THE INVENTION

The object of the invention is an apparatus for feeding bundles of laminations to a machine that processes or uses bundles of laminations, particularly to a machine for making rotors or stators for electric machines, or transformers, or the like, and having a vertical feeding duct into which the vertically oriented bundles of laminations are introduced in sequence from above.

The invention is designed to accelerate the feeding of bundles of laminations to such a machine, by eliminating or at least considerably reducing manual handling, and by replacing the known manually charged feeding apparatus with a simpler, less costly, and more reliable, automatic feeding apparatus, which may be even fully automatic.

This oject is accomplished by the provision of a feeding apparatus comprising a movable grasping and transferring device which cyclically takes a bundle of laminations from a magazine located in a withdrawal position, and conveys the said bundle of laminations co-axially over the opening of the feeding duct of the machine, so as to set the said bundle into the said duct.

The magazine for the bundles of laminations to be fed to a machine may be made in any suitable manner, and the bundles of laminations may be oriented as desired in this magazine.

Thus, for example, according to a particularly simple embodiment, the magazine for the bundles of laminations may consist of a stationary case, or of any other suitable housing capable of accomodating one bundle of laminations at a time, and permitting the grasping and transferring device to take therefrom the bundle of laminations. The bundles of laminations may be inserted into this stationary case either manually or mechanically.

According to another embodiment of the invention, the magazine for the bundles of laminations may consist of a succession of movable cases, for example a chain of cases, or of any equivalent suitable housings, each containing a bundle of laminations, and which are moved in sequence into a withdrawal station, from which the respective bundle of laminations is taken by the movable grasping and transferring device of the feeding apparatus.

The movable grasping and transferring device may be made and moved in any suitable manner. According to one preferred embodiment of the invention, it comprises at least one magnet that engages one longitudinal side of a bundle of laminations, over the entire length thereof. This grasping and transferring magnet may be an electromagnet and, in such case, the withdrawal of a bundle of laminations from the respective magazine and its release over the opening of the feeding duct of the machine are accomplished by having the electromagnet energizing current switched on and off. However, it is also possible to use a permanent magnet as grasping magnet and, in this case, the withdrawal of a bundle of laminations from the respective magazine is performed simply by attraction or contact, while for the release of the bundle of laminations over the opening of the feeding duct of the machine, the invention provides movable abutment members which are shiftable between an inactive position in which they allow the bundle of laminations to be freely positioned over the opening of the said feeding duct, and an active position in which the said members engage and hold back the bundle of laminations having been positioned over the opening of the feeding duct of the machine, thus causing the separation of this bundle of laminations from the grasping permanent magnet, upon retraction of this magnet.

The movement of the grasping and transferring device between the position in which it takes a bundle of laminations from the magazine, and the position in which it places the said bundle of laminations over the opening of the feeding duct of the machine, may be provided by any suitable kinematic motion and mechanism which is adapted for orienting the bundle of laminations in the withdrawal station, or is operated by any suitable electric, pneumatic, or hydraulic actuating means.

BRIEF DESCRIPTION OF THE DRAWINGS

These and other features of the invention and the advantages arising therefrom will be explained more in detail in the following specification of one preferred embodiment which is shown schematically by way of example in the accompanying drawings, in which:

FIGS. 3 and 4 are top plan views showing the apparatus for feeding bundles of laminations according to FIGS. 1 and 2, in the situation according to FIG. 2, and in two different operative positions.

DESCRIPTION OF PREFERRED EMBODIMENTS

Figure 1:
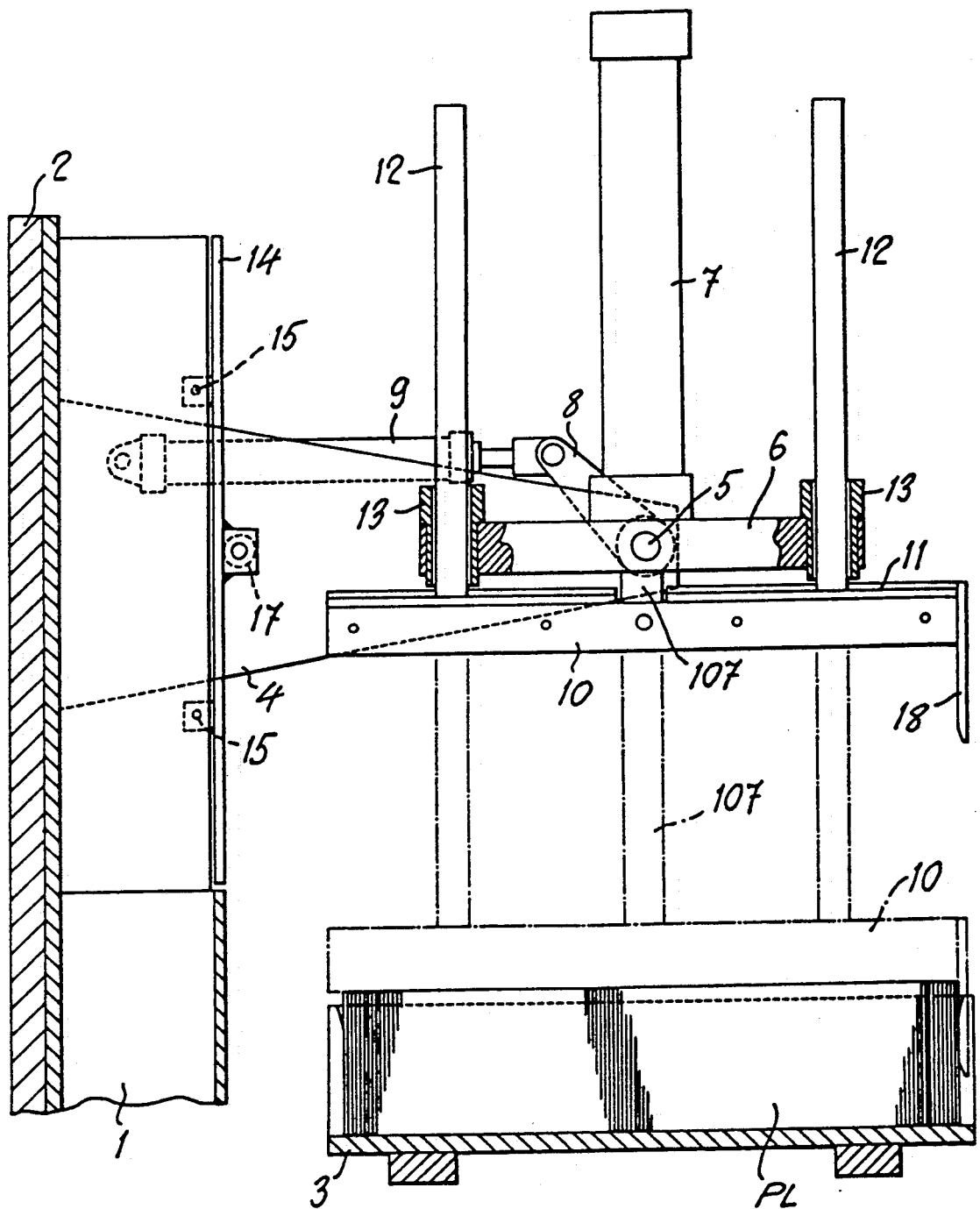
FIGS. 1 and 2 show in side elevation an apparatus for feeding bundles of laminations according to the invention, in two different operative position.

As shown in the drawings, reference numeral 1 designates the vertical feeding duct of a machine that processes or uses bundles of metallic sheets (bundles of laminations PL), and that may particularly be a machine for making stators or rotors for electric machines, or transformers, or the like. A section 2 of the machine frame extends above the opening of the feeding duct 1, along the rear side thereof.

Reference numeral 3 designates the magazine for the successive bundles of laminations PL to be separately introduced in sequence into vertical feeding duct 1. In the illustrated embodiment, magazine 3 consists of a stationary case open at the top and positioned horizontally so as to face feeding duct 1. Case 3 may contain just a bundle of laminations PL of a predetermined length, and is so oriented that the horizontal axis of this bundle is oriented orthogonally to the vertical longitudinal axis of the feeding duct 1.

Two fixed supporting arms 4 extend from and forwardly of section 2 of the machine frame, on two sides of feeding duct 1 and at a certain height above the opening thereof. A crosspiece 6 carrying a pneumatic or hydraulic actuating cylinder 7 is rotatably mounted between the ends of the said supporting arms 4 by means of a transversal horizontal shaft 5. The shaft 5 can be rotated over at least 90° by a link 8 and a pneumatic or hydraulic actuating cylinder 9. The crosspiece 6 and the actuating cylinder 7 are arranged between the two fixed supporting arms 4, while the link 8 and the respective actuating cylinder 9 are located on the outward side of one of the said supporting arms 4.

The actuating cylinder 7 is fixed to one side of the crosspiece 6, while its stem 107 is slidably fitted through the crosspiece 6 and carries a permanent magnet 10 which faces the opposite side of the said crosspiece 6, is parallel thereto, and is of a same length as the bundle of laminations PL. In lieu of only one permanent magnet 10, an equivalent group of two or more permanent magnets may be provided and fixed to the magnet holder 11 which is integral with the stem 107 of the pneumatic actuating cylinder 7. The magnet holder 11 and the permanent magnet or magnets 10 are also located between the two fixed supporting arms 4 and are slidably guided relative to the crosspiece 6, by guide rods 12 which are integral with the magnet holder 11 and are parallel to the stem 107 of the actuating cylinder 7, the said guide rods each being slidable in the respective bushing 13 on the crosspiece 6.

The assembly consisting of the crosspiece 6, the actuating cylinder 7, the magnet holder 11 and the permanent magnet or magnets 10, can be rotated by the actuating cylinder 9 and the link 8 so as to be caused to alternately assume two angular positions at 90° from one another. In one of these angular positions, the so-called withdrawal position shown in FIG. 1, the actuating cylinder 7 is vertical, with its stem 107 directed downwardly toward the magazine case 3, while the crosspiece 6, the magnet holder 11, and the permanent magnet 10 which are fixed to the free bottom end of the stem 107 of the actuating cylinder 7, are horizontal and parallel to the magazine case 3 and to the bundle of laminations PL contained therewithin. In the other angular position, the so-called transfer position shown in FIGS. 2, 3, and 4, the crosspiece 6, the magnet holder 11, and the permanent magnet 10 are vertical, and are directed toward the feeding duct 1, while the actuating cylinder 7 is horizontal and is located on the side of the crosspiece 6 which is opposite to the feeding duct 1.

Two opposed abutment bars 14 are arranged on two sides of the machine feeding duct 1, in the region above the opening thereof, and extend vertically over the front edge (lying opposite the fixed rear frame section 2) of the opening of the said feeding duct 1. These two abutment bars 14 are so guided as to be horizontally shiftable with the aid, for example, of bushings 16 which are slidable on pins 15 integral with the two fixed supporting arms 4, and the said bars are thus drawn toward, and away from each other, so as to be caused to take alternately an inactive, laterally outward position, in which they allow a bundle of laminations PL to pass between them, as shown in FIG. 3, and an active, laterally inward position in which the clearance between the two abutment bars 14 does not allow the passage of a bundle of laminations PL, as shown in FIG. 4. The abutment bars 14 are shifted between the said two positions by respective, either pneumatic or hydraulic cylinders 17, and their vertical extent preferably corresponds to the length of a bundle of laminations PL.

Figure 2:
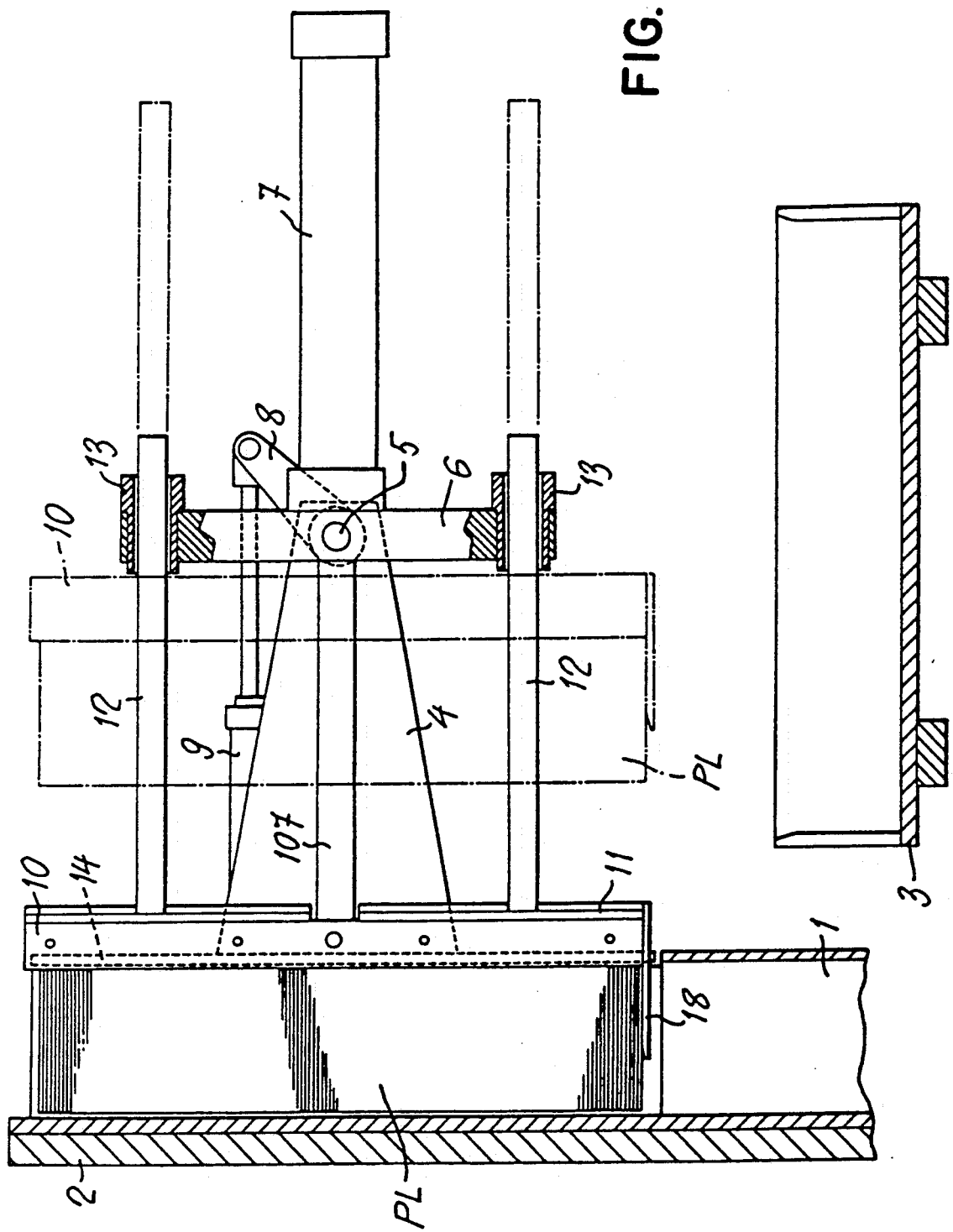

The automatic operation of the feeding apparatus, to be controlled in any suitable manner and by means of suitable sensors, is as follows:

A bundle of laminations PL is placed, for example by hand, into the stationary magazine case 3, and the shaft 5 is so rotated that the assembly consisting of the crosspiece 6, the actuating cylinder 7, the magnet holder 11, and the permanent magnet or magnets 10, is caused to take its withdrawal angular position shown in FIG. 1. The magnet holder 11 and the permanent magnet or magnets 10 are then lowered by the actuating cylinder 7 until the magnet or magnets 10 come into contact with the bundle of laminations PL contained in the case 3, so that they magnetically grasp this bundle of laminations PL, as shown by dash-and-dot lines in FIG. 1. Magnet holder 11 and permanent magnet or magnets 10 are then lifted, together with the grasped bundle of laminations PL, by the actuating cylinder 7, and then the shaft 5 is rotated over 90° by the actuating cylinder 9, in clockwise direction as seen B in FIG. 1, so that the assembly consisting of the crosspiece 6, the actuating cylinder 7, the magnet holder 11, and the permanent magnet or magnets 10, is moved together with the bundle of laminations PL, into its transfer angular position shown in FIG. 3, and by dash-and-dot lines in FIG. 2. The abutment bars 14 have already been positioned, or will in the meantime be moved into their inactive position, away from each other, as shown in FIG. 3. The magnet holder 11 and the permanent magnet or magnets 10 are now advanced horizontally together with the bundle of laminations PL, toward a feeding duct 1 by the actuating cylinder 7, so that the bundle of laminations PL is moved through the two widely spaced abutment bars 14, and is placed over the opening of the feeding duct 1, co-axially thereto, as shown in FIGS. 2 and 4.

The abutment bars 14 are then moved into their close, active position, i.e., they are drawn near to each other, as shown in FIG. 4, whereupon the crosspiece 6 and the magnet holder 11 with the permanent magnet or magnets 10 are horizontally retracted by the actuating cylinder 7. The bundle of laminations PL is, however, held back by the abutment bars 14 and is then separated from the permanent magnet or magnets 10, so that it drops down into the underlying feeding duct 1. After the crosspiece 6 with the magnet holder 11 and the permanent magnet or magnets 10 has been retracted horizontally from the feeding duct 1, the shaft 5 is rotated back over 90° by the actuating cylinder 9, in anticlockwise direction as seen in FIG. 2, whereby the assembly consisting of the crosspiece 6, the actuating cylinder 7, the magnet holder 11 and the permanent magnet or magnets 10, is again moved into the angular withdrawal position shown in FIG. 1, over a new bundle of laminations PL which has meanwhile been accommodated in the magazine case 3. The above-disclosed operative cycle is then repeated, particularly upon control from the machine, whenever the machine is to be fed with another bundle of laminations.

At one end, the magnet holder 11 may have a tongue 18 which, in the angular transfer position of the assembly consisting of the crosspiece 6, the actuating cylinder 7, the magnet holder 11 and the magnet or magnets 10, comes to be positioned under a bundle of laminations PL. This tongue 18 sustains the bundle of laminations PL held back by the abutment bars over the opening of the feeding duct 1, at the time the said assembly is being retracted and after the bundle of laminations PL has been separated from the magnet or magnets 10, until the said tongue is being slid away from the underside of the bundle of laminations PL, as shown in FIG. 2.

In a further embodiment (not shown), the single bundles of laminations PL can be mechanically and automatically brought into, and arranged in sequence, in the withdrawal station, which corresponds to the stationary case 3 provided in the above-disclosed and illustrated embodiment. For this purpose, a succession of movable cases 3 each containing a bundle of laminations PL, and which are, for example connected to each other in a chain, or which may be advanced by pushing them, can be moved against one another into the said withdrawal position.

Instead of being laid down and positioned horizontally in the withdrawal station, as in the above-disclosed and shown embodiment, the bundle of laminations PL may be oriented vertically in the withdrawal station, and, for example, may be arranged in a parallel, angularly offset position with respect to the position that the same is caused to take over the opening of the feeding duct 1, and which is shown in FIG. 2. In this case, instead of being rotated in a vertical plane by 90° around a horizontal axis, the assembly consisting of the crosspiece 6, the magnet holder 11 and the permanent magnet or magnets 10, will be rotated, for example, over 90° or 180° around a vertical axis.

The permanent magnet or magnets 10 which grasp a bundle of laminations PL may also consist of electromagnets. In this case, the abutment bars 14 for separating a bundle of laminations PL from the permanent magnet or magnets 10 may even be omitted, since the bundle of laminations PL is grasped in the withdrawal station and is released over the opening of the feeding duct 1 simply by switching the electromagnet energizing current on and off.

I claim:

1. An apparatus for feeding bundles of laminations (PL) to a machine that processes or uses bundles of laminations, said apparatus comprising a vertical feeding duct (1) into which vertically oriented bundles of laminations (PL) are introduced in sequence, said apparatus further comprising a movable grasping and transferring device (10, 11) for cyclically taking bundles of laminations (PL) from a magazine (3) located in a withdrawal station, and conveying said bundle of laminations (PL) over an opening of said feeding duct (1) in alignment with said feeding duct, and positioning said bundle into said duct, and wherein said grasping and transferring device consists of at least one permanent magnet (10), for grasping each bundle of laminations (PL) from a respective magazine (3) at said withdrawal station by simply contacting same with said at least one permanent magnet, movable abutment members (14) and means for shifting said abutment members between an inactive position in which said bundle of laminations (PL) are freely positioned over said opening of said feeding duct (1), and an active position in which said abutment members are positioned to engage and hold back said bundle of laminations (PL) positioned over said opening of said feeding duct, thus causing separation of said bundle of laminations (PL) from said at least one permanent magnet (10) upon retraction of said grasping and transferring device.

2. Apparatus according to claim 1, wherein said grasping and transferring device comprises magnet means (10) that engages one longitudinal side of a bundle of laminations (PL) over the entire length thereof.

3. Apparatus according to claim 1, wherein said grasping and transferring device comprises at least one electromagnet, and withdrawal of a bundle of laminations (PL) from the respective magazine (3) in said withdrawal station, and release of said bundle of laminations (PL) over said opening of said feeding duct (1) are accomplished by switching electromagnet energizing current on and off.

4. Apparatus according to claim 1, wherein said movable abutment members consist of two abutment bars (14) arranged on opposite sides of the inlet for a bundle of laminations (PL) moved into position over said opening of said feeding duct (1), said abutment members being so shiftable as to be drawn toward and away from each other, whereby said inlet will be selectively entirely opened and partly closed.

5. Apparatus according to claim 1, wherein said grasping and transferring device (10, 11) is slidably mounted on a supporting member (6) which is rotatable around an axis (5) perpendicular to the direction in which said grasping and transferring device is caused to slide.

6. Apparatus according to claim 5, wherein the supporting member (6) is adapted to be rotated over at least 90° around a horizontal axis (5), in such a manner that said slidable grasping and transferring device (10, 11) and the direction of its sliding is alternately turned toward a magazine (3) containing said bundle of laminations (PL) to be taken therefrom, and toward a region above said opening of said feeding duct (1).

7. Apparatus according to claim 5, wherein said supporting member (6) is adapted to be rotated around a vertical axis, in such a manner that said grasping and transferring device (10, 11) and the direction of its sliding is alternately turned toward a region above said opening for said feeding duct (1) and toward a magazine angularly offset in a horizontal direction, relative to said region, and which contains said bundle of laminations (PL) to be taken therefrom.

8. Apparatus according to claim 1, wherein said magazine in said withdrawal station consists of a stationary housing (3) for accommodating one bundle of laminations (PL) at a time, and permitting withdrawal of said bundle of laminations by said grasping and transferring device (10, 11).

9. Apparatus according to claim 1, wherein said magazine for the bundles of laminations (PL) consists of a succession of movable housings each containing a bundle of laminations, said housings being moved in sequence into said station for the withdrawal of a bundle of laminations (PL) by said grasping and transferring device (10, 11).

10. Apparatus according to claim 9, including conveyor means comprising said housings each adapted to contain a bundle of laminations.

* * * * *